United States Patent [19]

Rhodehamel et al.

[11] Patent Number: 6,061,599

[45] Date of Patent: *May 9, 2000

[54] AUTO-CONFIGURATION SUPPORT FOR MULTIPLE PROCESSOR-READY PAIR OR FRC-MASTER/CHECKER PAIR

[75] Inventors: Michael W. Rhodehamel; Nitin V. Sarangdhar; Chakrapani Pathikonda, all of Beaverton, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/621,773

[22] Filed: Mar. 22, 1996

Related U.S. Application Data

[63] Continuation of application No. 08/204,867, Mar. 1, 1994, abandoned.

[51] Int. Cl.[7] .................................................. G05B 15/00
[52] U.S. Cl. ..................................... 700/2; 700/82; 713/1
[58] Field of Search ..................................... 364/131–136, 364/184–187; 395/182.01, 182.08, 182.09, 183.12, 200.03, 200.05, 200.1, 200.11, 284, 290, 299, 730, 737, 741, 800, 823, 828, 830, 836, 200.31, 200.38, 200.39, 200.5, 200.52; 371/68.1, 68.3; 700/2–7, 79–82; 713/1; 709/209, 221, 222; 714/11

[56] References Cited

U.S. PATENT DOCUMENTS

| | | | |
|---|---|---|---|
| 4,313,196 | 1/1982 | Oblonsky | 370/85 |
| 4,375,639 | 3/1983 | Johnson, Jr. | 340/825.5 |
| 4,747,100 | 5/1988 | Roach et al. | 370/86 |
| 4,785,394 | 11/1988 | Fischer | 364/200 |
| 4,792,955 | 12/1988 | Johnson et al. | 371/11.1 |
| 4,823,256 | 4/1989 | Bishop et al. | 395/182.08 |
| 4,975,831 | 12/1990 | Nilsson et al. | 395/800 |
| 4,982,400 | 1/1991 | Ebersole | 370/85.15 |
| 5,151,994 | 9/1992 | Wille et al. | 395/800 |
| 5,204,669 | 4/1993 | Dorfe et al. | 340/825.52 |
| 5,230,044 | 7/1993 | Cao et al. | 395/325 |
| 5,239,630 | 8/1993 | Lary et al. | 395/325 |
| 5,274,767 | 12/1993 | Maskovyak | 395/800 |
| 5,297,067 | 3/1994 | Blackborow et al. | 364/708.1 |

FOREIGN PATENT DOCUMENTS

| | | |
|---|---|---|
| 0432463A2 | 6/1991 | European Pat. Off. . |
| 2048619A | 12/1980 | United Kingdom . |
| 2126848A | 3/1984 | United Kingdom . |
| 2165726A | 4/1986 | United Kingdom . |
| 2216368A | 10/1989 | United Kingdom . |

OTHER PUBLICATIONS

Val Popescu, et al., "The Metaflow Architecture", IEEE Micro, Jun. 1991, pp. 10–13 and 63–73.

Intel Corporation, Multibus II Bus Architecture Specification Handbook, "Parallel System Bus Specification", 1984, pp. 2–33 to 2–41.

*Primary Examiner*—William Grant
*Assistant Examiner*—Steven R. Garland
*Attorney, Agent, or Firm*—Blakely, Sokoloff, Taylor & Zafman LLP

[57] ABSTRACT

Auto-configuration support for a multiple processor-ready pair or FRC-master/checker pair is achieved through the use of an initialization signal issued to each agent on a bus during system reset. The agents on the bus are interconnected using a rotating interconnect scheme which causes each agent to sample a signal issued from another agent on a pin different from the pin on which the other agent issued the signal. When operating in FRC-master/checker mode, the checker agent operates as if it were the master agent, thereby checking the operation of the master agent. The initialization signal modifies the input and or output lines connected to the pins of the checker agent based on this rotating interconnect scheme, thereby ensuring the checker agent properly checks the master agent's operation.

36 Claims, 6 Drawing Sheets

AUTO-CONFIGURATION SUPPORT FOR MULTIPLE PROCESSOR-READY PAIR OR FRC-MASTER/CHECKER PAIR

RELATED APPLICATIONS

This is a continuation of application Ser. No. 08/204,867, filed Mar. 1, 1994, now abandoned.

This application is related to application Ser. No. 08/205,035, now U.S. Pat. No. 5,515,516, entitled "Initialization Mechanism for Symmetric Arbitration Agents," which is assigned to the assignee of the present application.

BACKGROUND OF THE INVENTION

1. Field of the Invention

The present invention pertains to the field of computer systems having multiple processors. More particularly, this invention relates to the field of initializing processors to operate independently or as master/checker pairs.

2. Background

In modern computer systems, multiple processing agents are often coupled to a bus. These multiple processing agents frequently operate in parallel, i.e., multiple processor (MP) mode. In MP mode, each agent performs a different set of tasks to process the software running on the system. Thus, each agent operates independently; that is, each agent is performing a different set of tasks, although these tasks may be combined with the tasks performed by another processor in order to increase the execution speed of the software.

Occasionally, however, it may be beneficial for a computer system to operate such that one processing agent checks the operation of another processing agent. In such a situation, each pair of processing agents may thus create a functional redundancy checking (FRC) master/checker pair. That is, one processing agent, the master agent, operates independently as described above. A second processing agent, the checker agent, performs the same tasks in lock-step as the master agent. Thus, the checker agent operates as if it were the master agent. The results of the tasks performed by the checker agent are checked against those of the master agent; if the calculations do not match then a FRC error results.

As technology advances, the processing agents used in computer systems become more and more reliable. Thus, for the majority of applications and uses the MP mode operates within an acceptable margin of error. However, in some situations, such as certain military or high-risk applications, the use of the FRC-master/checker mode would be beneficial.

Thus, it would be beneficial for a processing agent to be able to efficiently operate independently, however also have the capability to operate as an agent within an FRC-master/checker pair. Furthermore, it would be beneficial for a processing agent to operate in FRC mode with a minimal amount of complexity and overhead due to the infrequent use of the FRC mode. The present invention provides such a solution.

Figure 1:
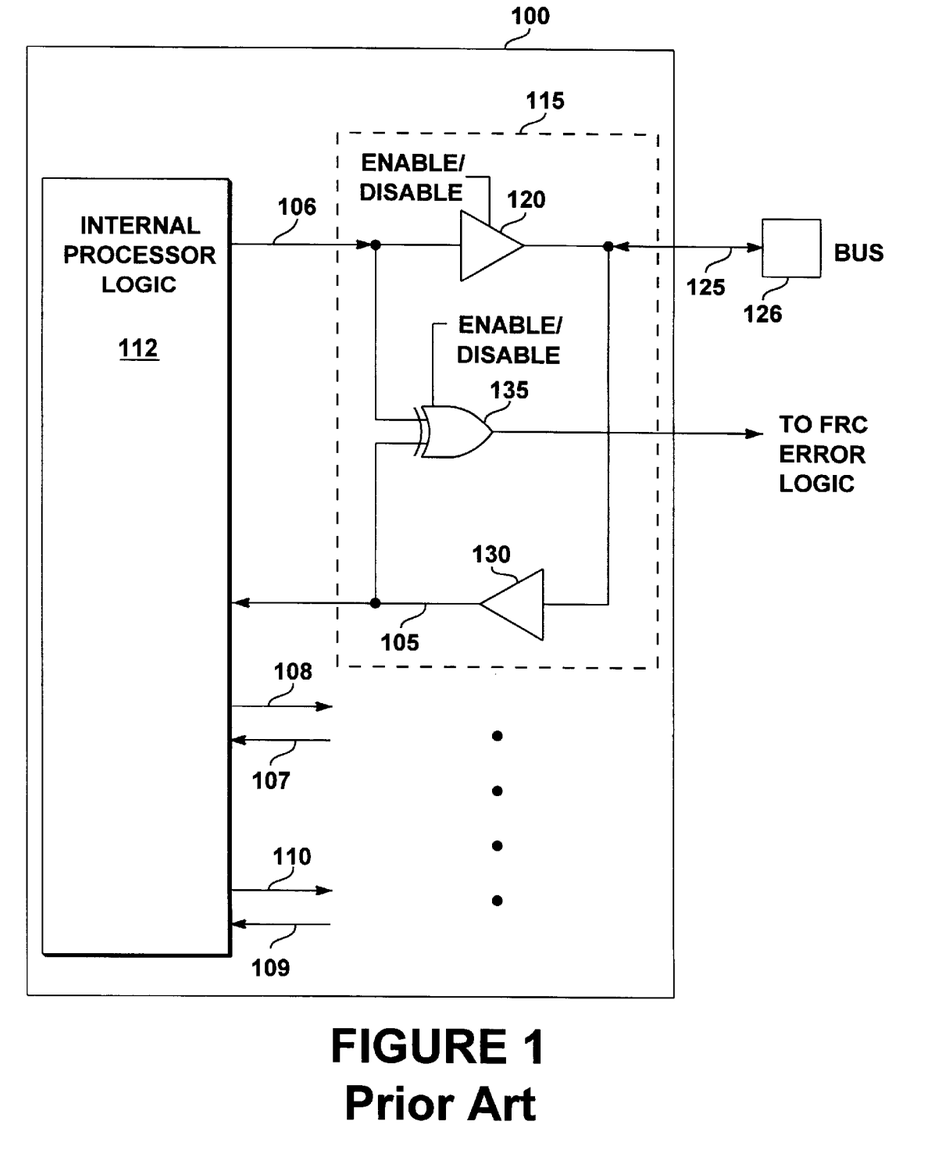
FIG. 1 is a block diagram of a prior art configuration for a FRC-master/checker pair.

FIG. 1 shows a block diagram of a prior art configuration for a FRC-master/checker pair. A processor 100 is shown with multiple output signals 106, 108, and 110, and corresponding input signals 105, 107 and 109, respectively. The output signals originate within the internal processor logic 112 and are run through FRC logic 115 before being output to the bus. In the output mode, an output signal 106 from processor 100 drives exclusive-or (XOR) gate 135 and three-state buffer 120; when processor 100 is a FRC master, buffer 120 is enabled. Signal 125 is the output of buffer 120, which directly drives the bus pin 126 and buffer 130. When processor 100 receives input from bus pin 126, signal 125 is fed back as an input to buffer 130. Signal 105, the output of buffer 130, is fed back to processor logic 112.

Signal 105 is also fed as a second input to XOR gate 135. Thus, the two inputs to XOR gate 135 are always at the same logic level when processor 100 is driving the output. When the processor is a bus master, XOR gate 135 is disabled.

Exclusive-or gate 135 is enabled if processor 100 is operating as a FRC checker. When processor 100 is a checker processor, buffer 120 is disabled. That is, all output signals from processor logic 112, such as output signal 106, reach a buffer, such as buffer 120, and terminate. Thus, the outputs from processor 100 will never be driving the bus. Instead, the corresponding output from the master processor travels over the bus and onto bus pin 126, which is received by the checker as signal 125. Since the checker processor 100 and the master processor are performing the same set of tasks, this signal from the master processor should be at the same level as checker processor 100 is issuing on output signal 106.

If these two signals are the same, then the output of XOR gate 135 is low, which indicates to the FRC error logic that no error occurred. However, if the two inputs are not the same, then the output of XOR gate 135 is high, which indicates to the FRC error logic that an error occurred. An error must have occurred because the output from the checker processor, processor 100, does not match the corresponding output from the master processor. Thus, the FRC error logic is informed of an error and may respond accordingly.

In many modern computer system applications, one primary goal is support for a MP-ready system. A secondary goal is to allow a MP-ready system to be reconfigurable to a FRC system with a simple configuration option. Thus, a MP-ready system containing "2n" processors should be capable of reconfiguration to a FRC system of "n" FRC master/checker pairs. Such a system allows a system manufacturer to build a common processor board accommodating both configurations and choose the mode of operation by changing the simple configuration option.

One important pre-requisite of the prior art systems, such as that shown in FIG. 1, was that the master and checker processors had their identical pins tied together. This ensured that the checker processor checked all the corresponding outputs of the master processor.

One problem in modern multiple processor computer systems, however, is that the interconnection of signals between processing agents may vary. That is, the output signal from the master processor is not necessarily tied to the same pin of the checker processor. Thus, in such a computer system the FRC configuration of the prior art would not produce the correct results. Therefore, in such a computer system it would be beneficial to provide a system which supports FRC mode with minimal complexity while at the same time allows efficient operation in multiple processor mode. Additionally, it would be beneficial to provide a versatile system which allows for processor interchangability with minimal overhead. The present invention provides such a system.

SUMMARY AND OBJECTS OF THE INVENTION

A system providing auto-configuration support for a multiple processor-ready pair or FRC-master/checker pair is described herein. Multiple processing agents are coupled to a bus. The address, data and most control signals of these processors are bussed together. However, some signals, specifically the signal group utilized for bus arbitration, are wired together using a rotating interconnect scheme. In the rotating interconnect scheme, each agent samples a signal issued from another agent on a pin different from the pin on which the other agent issued the signal.

The present invention allows pairs of processors to be auto-configured as either multiple processor-ready pairs or FRC-master/checker pairs. This auto-configuration is accomplished through the use of an initialization signal during system reset. When the initialization signal is deasserted the processors are configured as multiple processor-ready processors; when the signal is asserted the processors are configured as FRC-master/checker pairs.

When operating as an FRC-master/checker pair, the master agent performs calculations and issues signals onto the bus. The checker agent operates as if it were the master agent, and performs the same calculations as the master agent, however the signals it issues are not placed onto the bus. The checker agent compares the signals issued onto the bus by the master agent with the signals it believes it is issuing onto the bus. If the signals do not match, then the checker signals an error.

Due to the nature of the rotating interconnect scheme, when the master agent issues a signal from certain pins, that signal is not received on the same pin of the checker agent. Thus, the initialization signal modifies the input and/or output lines inside a processor connected to the pins, based on the rotating interconnect scheme. This modification is done because to properly check the signal issued by the master agent, the checker agent must compare it to the signal it would have issued onto the bus. Thus, the checker agent must modify the input and/or output lines according to the rotating interconnect scheme to ensure a proper comparison.

In addition, the checker also recreates conditions for its internal logic identical to that of the master, although the bus pins that create these conditions are different between the master and the checker. Furthermore, the selection of FRC master, FRC checker versus a multiple-processor ready processor is reconfigurable based on the initialization parameters.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be comprehended by one skilled in the art that the present invention may be practiced without these specific details. In other instances, well known methods, procedures, components, and circuits have not been described in detail as not to obscure aspects of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 2A:
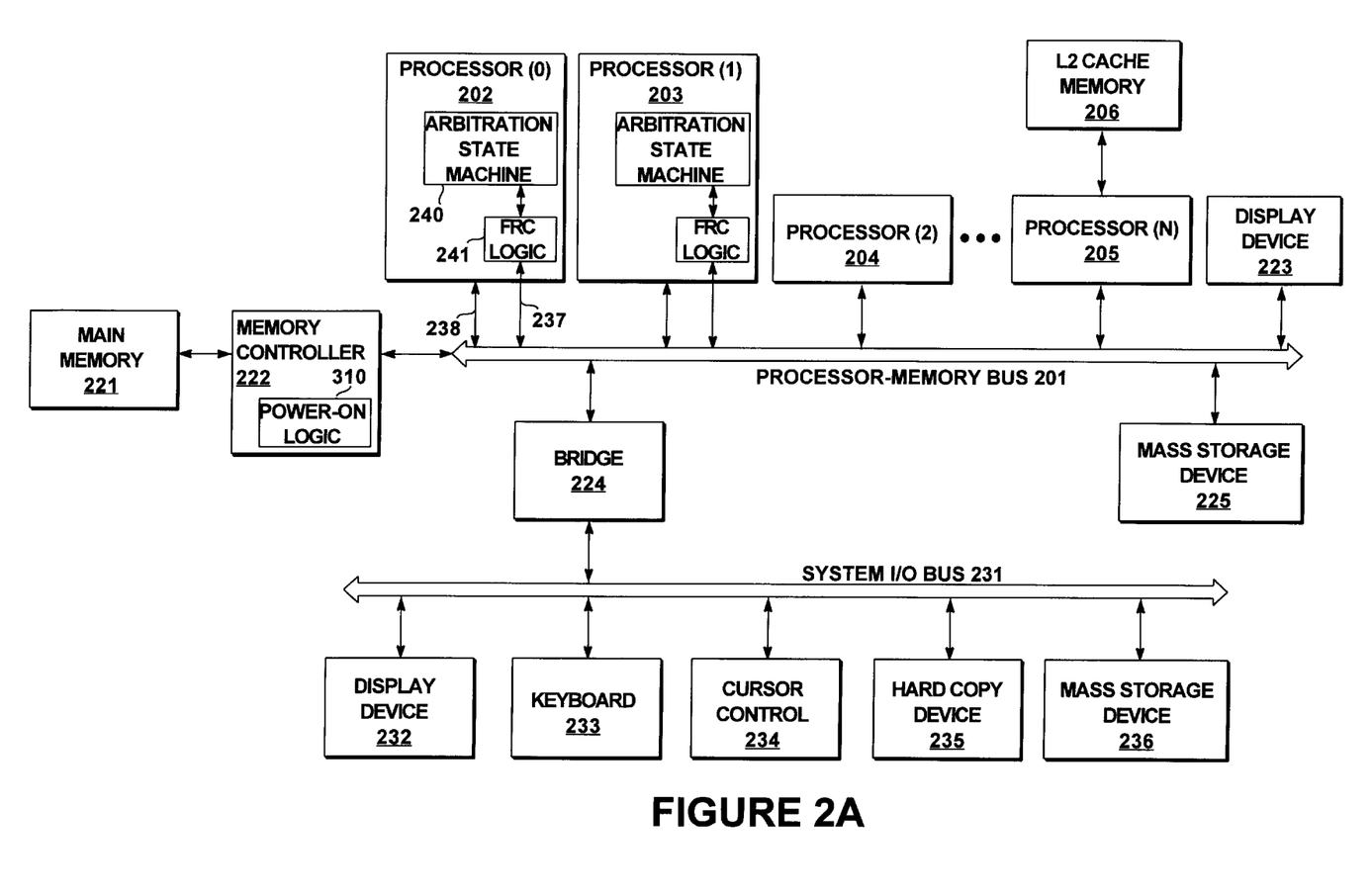
FIG. 2A is an overview of a multi-processor computer system of the present invention.

FIG. 2a shows an overview of an example multiprocessor computer system of the present invention. The computer system generally comprises a processor-memory bus or other communication means 201 for communicating information between one or more processors 202, 203, 204 and 205. Processor-memory bus 201 includes address, data and control buses. Processors 202 through 205 may include a small, extremely fast internal cache memory, commonly referred to as a level one (L1) cache memory for temporarily storing data and instructions on-chip. In addition, a bigger, slower level two (L2) cache memory 206 can be coupled to a processor, such as processor 205, for temporarily storing data and instructions for use by processor 205. In one mode, the present invention may include Intel® architecture microprocessors as processors 202 through 205; however, the present invention may utilize any type of microprocessor architecture, or any of a host of digital signal processors.

Also coupled to processor-memory bus 201 are processors 202 through 204 for processing information in conjunction with processor 205. Processor 202, 203, or 204 may comprise a parallel processor, such as a processor similar to or the same as processor 205. Alternatively, processor 202, 203, or 204 may comprise a co-processor, such as a digital signal processor.

Processor 202 is coupled to processor-memory bus 201 over request bus 237 and bus 238. Processor 202 also contains an arbitration state machine 240 which controls both when processor 202 requests access to processor-memory bus 201 and when processor 202 is given ownership of bus 201. Processor 202 also includes FRC logic 241 which supports the FRC master/checker pair mode described below. Request bus 237 transfers the signals associated with bus arbitration between processor 202 and the remaining agents coupled to processor-memory bus 201. The remaining signals transferred between processor 202 and processor-memory bus 201 are transferred over bus 238. These remaining signals include data signals, address signals, and additional control signals. In one embodiment, request bus 237 and bus 238 are part of processor-memory bus 201.

In one mode, the other processors 203 through 205 also include an arbitration state machine 240 and FRC logic 241. In this mode, the processors 203 through 205 are also coupled to processor-memory bus 201 with a request bus 237 and bus 238 as shown with regard to processor 202.

The processor-memory bus 201 provides system access to the memory and input/output (I/O) subsystems. A memory controller 222 is coupled with processor-memory bus 201 for controlling access to a random access memory (RAM) or other dynamic storage device 221 (commonly referred to as a main memory) for storing information and instructions for processors 202 through 205. In one mode, memory controller 222 contains power-on logic 310, described below. A mass data storage device 225, such as a magnetic disk and disk drive, for storing information and instructions, and a display device 223, such as a cathode ray tube (CRT), liquid crystal display (LCD), etc., for displaying information to the computer user are coupled to processor-memory bus 201.

An input/output (I/O) bridge 224 is coupled to processor-memory bus 201 and system I/O bus 231 to provide a communication path or gateway for devices on either processor-memory bus 201 or I/O bus 231 to access or transfer data between devices on the other bus. Essentially, bridge 224 is an interface between the system I/O bus 231 and the processor-memory bus 201.

I/O bus 231 communicates information between peripheral devices in the computer system. Devices that may be coupled to system bus 231 include a display device 232, such as a cathode ray tube, liquid crystal display, etc., an alphanumeric input device 233 including alphanumeric and other keys, etc., for communicating information and command selections to other devices in the computer system (e.g., processor 202) and a cursor control device 234 for controlling cursor movement. Moreover, a hard copy device 235, such as a plotter or printer, for providing a visual representation of the computer images and a mass storage device 236, such as a magnetic disk and disk drive, for storing information and instructions may also be coupled to system bus 231.

In some implementations, it may not be required to provide a display device for displaying information. Certain implementations of the present invention may include additional processors or other components. Additionally, certain implementations of the present invention may not require nor include all of the above components. For example, processors 202 through 204, display device 223, or mass storage device 225 may not be coupled to processor-memory bus 201. Furthermore, the peripheral devices shown coupled to system I/O bus 231 may be coupled to processor-memory bus 201; in addition, in some implementations only a single bus may exist with the processors 202 through 205, memory controller 222, and peripheral devices 232 through 236 coupled to the single bus.

Figure 2B:
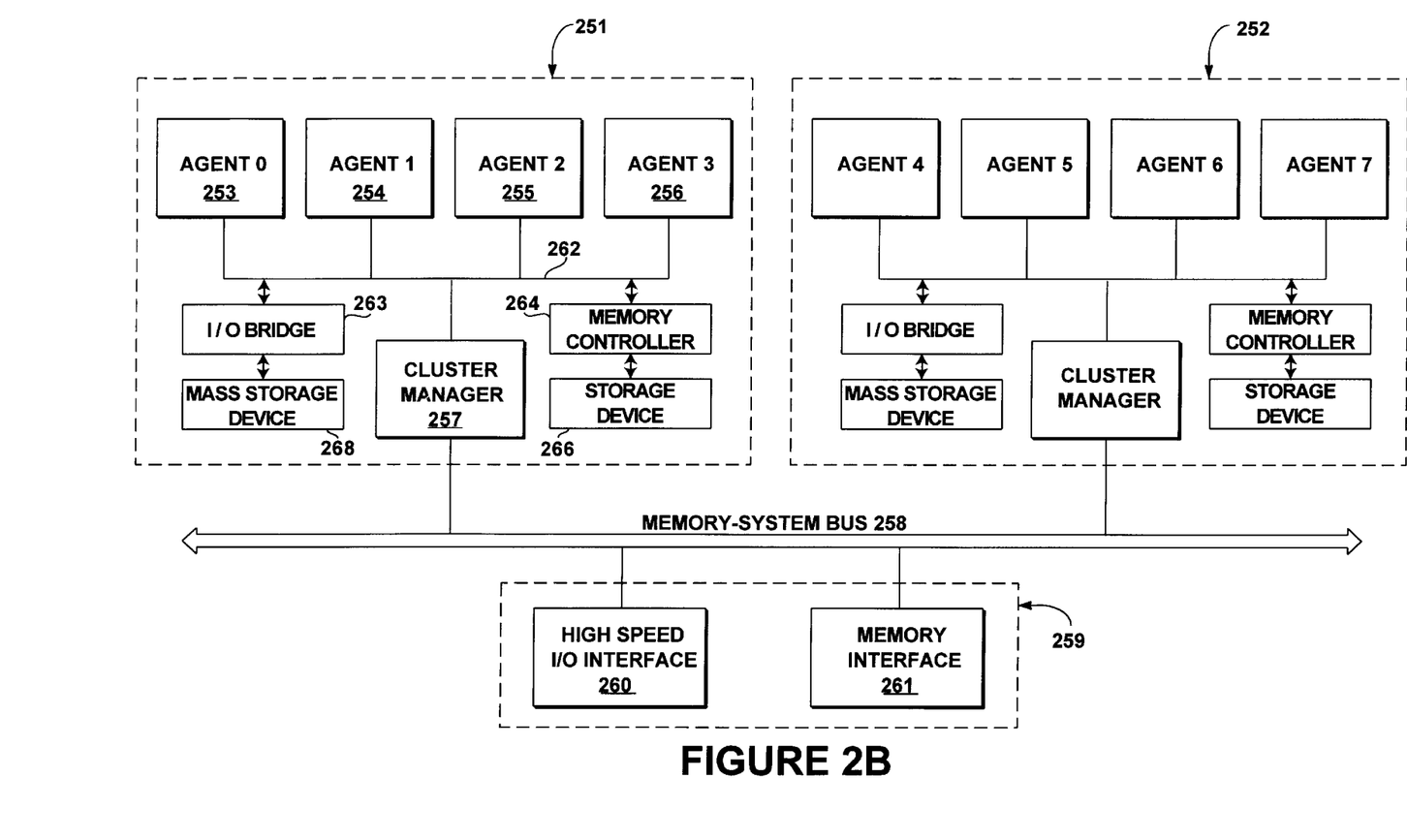
FIG. 2B is a diagram showing an exemplary bus cluster system of the present invention.

FIG. 2b is a block diagram showing an exemplary bus cluster system of the present invention. The present invention can apply to multiprocessor computer systems having one or more clusters of processors. FIG. 2b shows two such clusters 251 and 252. Each of these clusters are comprised of a number of processors. For example, cluster 251 is comprised of four agents 253–256, a cluster manager 257, memory controller 264 and I/O bridge 263. In one mode, cluster manager 257 also includes a cache memory. Agents 253–256 can include microprocessors, co-processors, digital signal processors, etc., coupled to a bus 262; for example, agents 253 through 256 may be the same as processor 202 shown in FIG. 2a, being coupled to bus 262 via a request bus 237 and bus 238. Cluster manager 257 and its cache is shared between these four agents 253–256. Each cluster is coupled to a memory system bus 258. These clusters 251–252 are coupled to various other components of the computer system through a system interface 259. The system interface 259 includes a high speed I/O interface 260 for interfacing the computer system to the outside world and a memory interface 261 which provides access to a main memory, such as a DRAM memory array (these interfaces are described in greater detail in FIG. 2a).

In one embodiment, each cluster includes a local memory controller and/or a local I/O bridge. For example, cluster 251 of FIG. 2b includes a local memory controller 264 coupled to bus 262. Local memory controller 264 manages accesses to a RAM or other dynamic storage device 266 contained within cluster 251. Cluster 251 may also include a local I/O bridge 263 coupled to bus 262. Local I/O bridge 263 manages accesses to I/O devices within the cluster, such as a mass storage device 268, or to an I/O bus, such as system I/O bus 231 of FIG. 2a.

Certain implementations of the present invention may not require nor include all of the above components. For example, cluster 251 or 252 may comprise fewer than four agents. Additionally, certain implementations of the present invention may include additional processors or other components.

Figure 3:
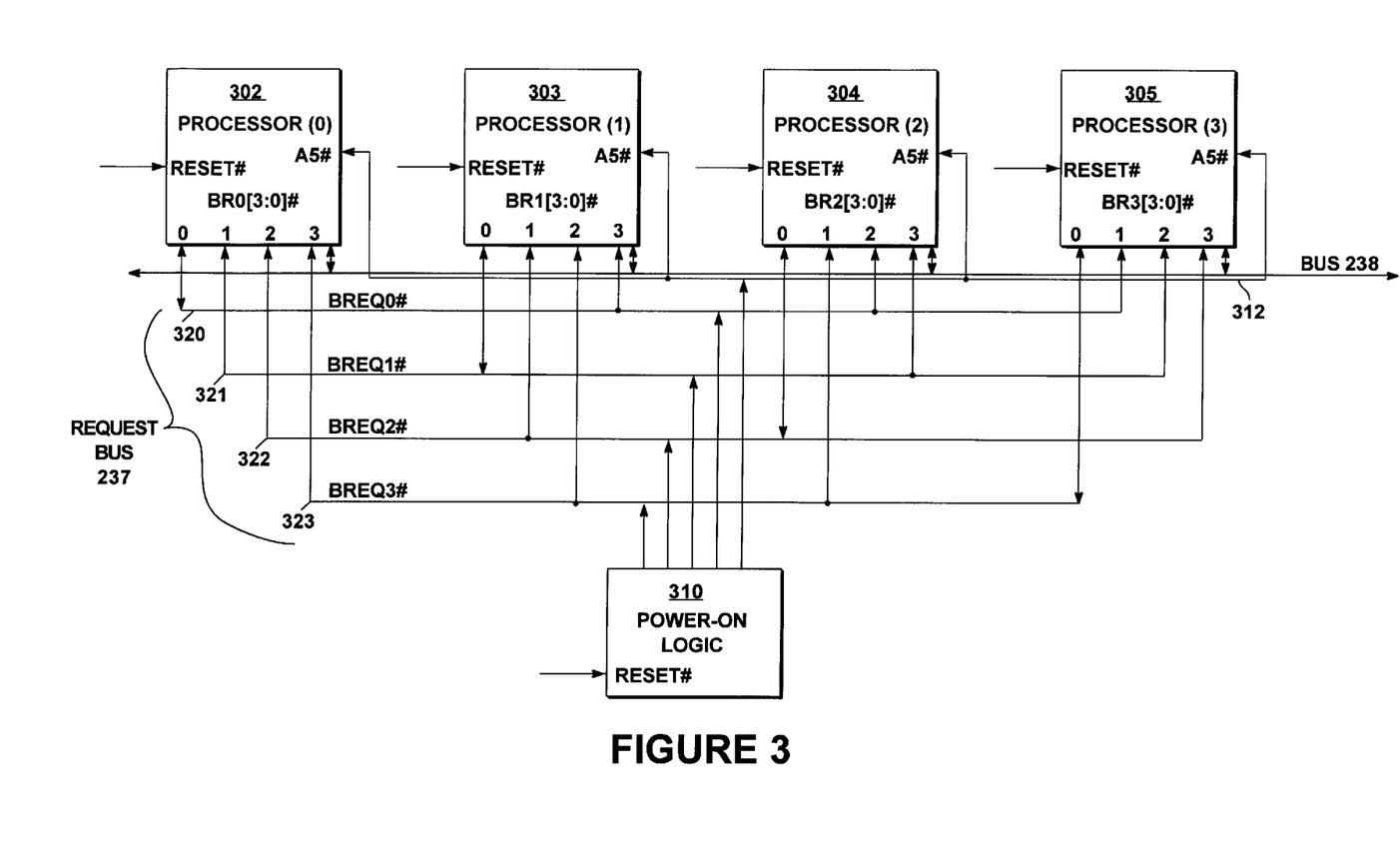
FIG. 3 is an exemplary block diagram showing initialization and arbitration connections for one embodiment of the present invention.

FIG. 3 shows an exemplary interconnection of four symmetric agents coupled to a bus, e.g. processor-system bus 201 of FIG. 2a, or bus 262 of FIG. 2b. These "symmetric agents" are processors, or similar devices, that are somewhat alike in their bus usage requirements. It should be noted that the interconnection of FIG. 3 is exemplary only; the scope of the present invention is not limited to the interconnection shown. Other interconnection schemes may be utilized which are within the spirit and scope of the present invention. Processors 302 through 305 are exemplary only; the agents shown in FIG. 3 can include microprocessors, co-processors, digital signal processors, etc.

The initialization and arbitration connections for four agents are shown in FIG. 3. The four agents shown in FIG. 3 will be discussed as if they were identical parallel processors; however, as discussed above, the agents on processor-memory bus 201, or bus 262, need not be identical. It should be understood by those skilled in the art, however, that the two processors of a FRC-master/checker pair must produce identical outputs given the same set of inputs.

In one embodiment of the present invention, the address, data, and most control signals are bussed together. That is, address or data signals issued by one processor will be received by identical pins on every other processor on the bus. However, some control signals, specifically those signals involved in bus arbitration, are wired together using a scheme defined as "rotating interconnect".

FIG. 3 shows the rotating interconnect scheme of request bus 237. Address signals, data signals, and additional control signals are transferred to other agents coupled to processor-memory bus 201 of FIG. 2a (or bus 262 of FIG. 2b) via bus 238. The rotating interconnect scheme for arbitration signals on request bus 237 between processors 302 through 305 is shown in FIG. 3. The scheme is accomplished over BREQ [3:0]# control lines 323, 322, 321, and 320. BREQ[3:0]# control lines 320 through 323 are part of the control bus, which is part of the processor-memory bus 201 of FIG. 2a, or bus 262 of FIG. 2b, as described above. Additional details of processor-memory bus 201 have not been included so as not to unnecessarily clutter the drawings and obscure the present invention.

In the arbitration scheme supported by one embodiment of the present invention, each processor drives a single request line to request bus ownership while observing request lines from other agents on the bus. As shown in FIG. 3, each agent(x) has four arbitration pins: a BRx0# pin, a BRx1# pin, a BRx2# pin, and a BRx3# pin. To request bus ownership, an agent(x) drives a signal onto the bus over its BRx0# pin; note that whether this signal is actually driven onto the bus depends on whether agent(x) is operating as a checker agent of a master/checker pair, as discussed in more detail below. As can be seen from FIG. 3, the BRx0# pin of each agent(x) is coupled to a different input pin for each other agent(y). Thus, each agent(y) receives the signal from the requesting agent's BRx0# pin on a different input pin.

In order to participate in bus arbitration, each agent on the bus maintains an arbitration counter. The arbitration counter informs each agent which of the agents has ownership of the bus. Each agent updates its arbitration counter when an agent on the bus releases its ownership of the bus. If an agent's arbitration counter equals zero, then the agent observes itself as owner of the bus (if it is requesting ownership). If an agent's arbitration counter equals n, where n does not equal zero, then the agent observes the bus owner as the agent coupled to its BRn# pin.

In one embodiment of the present invention, power-on logic 310 asserts a set of initialization signals during system reset which provides each agent on the bus with the proper configuration values. In one mode, system reset is known by processors 302 through 305 by assertion of a RESET# signal which is input to each processor and power-on logic 310. The RESET# signal is asserted by the computer system, for example, whenever the system is powered-on or a physical "reset" switch is actuated. Alternatively, the RESET# signal may be asserted at any predetermined event, e.g. at a particular time every day, or at a random event, such as after the system has been operating for a random period of time.

The initialization signals asserted by power-on logic 310 include, for example, signals indicating the agent identifications for each processor, whether the system is operating in FRC-master/checker mode, signals indicating the error checking configurations for the system, etc. In one embodiment of the present invention, power-on logic 310 is contained within memory controller 222. In an alternate embodiment, power-on logic 310 is contained within another agent on processor-memory bus 201, such as bridge 224.

The arbitration counter for a given agent is initialized at system reset based on the agent identification for that agent. In multiple processor mode, each agent on the bus has a unique agent identification, therefore the arbitration counter is initialized to a different value for each agent. However, when operating in FRC mode, the checking agent must behave as though it were the master agent so that when the master agent has ownership of the bus the checking agent believes it has ownership of the bus. This is accomplished by assigning the same agent identification to both the master agent and the checker agent at system reset. By assigning both the master and checker agents the same agent identification, the arbitration counters for both are initialized to the same value.

At system reset, power-on logic 310 either asserts or deasserts the A5# signal line 312. In one embodiment, the A5# signal line is coupled to each agent as part of bus 238 of FIG. 2a. Whether to assert or deassert line 312 is determined by the configuration of power-on logic 310. Power-on logic 310 may be configured to assert or deassert the A5# signal line by any conventional means; for example, power-on logic 310 may be configured by the proper placement of a jumper. If the A5# signal line 312 is deasserted then each agent knows the system is operating in multiple processor mode. However, if the A5# signal line 312 is asserted, then each agent knows the system is operating in FRC-master/checker mode.

When the system is in FRC mode each processor determines whether it is operating as a master or as a checker. This determination is made based on the agent identification for each agent. During system reset, each agent(x) initially assigns itself a unique agent identification value according to the following formula:

$$id = (-n) \bmod max\_agents$$

where id is the agent identification for agent(x), n is the number of the BRxn# pin sampled active during system reset by agent(x), and max_agents is the maximum number of symmetric agents on the bus which can participate in arbitration.

In one embodiment of the present invention, a bus 201 has a maximum of the four processors 302 through 305 coupled to it. Thus, the max_agents value in this embodiment is equal to four; in one mode this value is hardwired into each processor 302 through 305. However, a computer system may still have more than four processors, such as in the multiple-cluster system shown in FIG. 2b. It should be noted that the max_agents value is the maximum number of symmetric agents which can participate in arbitration on the bus, not the number of agents actually coupled to the bus. Although the value is hardwired to four, fewer than four processors could be coupled to the bus. For example, if processor 305 were not coupled to the bus, whenever the processors 302 through 304 determined the agent which drives BREQ3# control line 323 should have ownership of the bus, no request signal would be asserted on BREQ3# line 323. Thus, processors 302 through 304 would update their arbitration counters accordingly, allowing the agent which drives BREQ0# line 320 ownership of the bus (assuming that agent currently requests ownership).

The exemplary four-processor interconnection of FIG. 3 shows each processor(x) having four BRxn# pins which are used in bus arbitration. That is, each processor(x) has a set of BRx[3:0]# pins connecting it to every other processor. The BRxn# pin of processor(x) is connected to a different BRyn# pin of each other processor(y) over a BREQ[3:0]# control line. For example, the BR00# pin of processor 302 is connected to the BR13# pin of processor 303 over BREQ0# line 320. Thus, if BREQ0# line 320 is asserted during system reset, the BRxn# pin sampled by each processor(x) during system reset is dependent on which pin is connected to the BREQ0# bus pin.

It should be noted that any one of the BREQ[3:0]# control lines may be asserted by power-on logic 310 during system reset. In one embodiment, which BREQ# control line 320 through 323 will be asserted is predetermined in the power-on logic 310. That is, power-on logic 310 is preconfigured to assert the same control line at every system reset. In one mode, which control line power-on logic 310 asserts is hardwired within power-on logic 310. In an alternate mode, a jumper is set on power-on logic 310; this jumper could be varied among different systems or between system resets within the same system.

In an alternate embodiment, power-on logic 310 is not preconfigured to assert the same BREQ# control line 320 through 323 at every system reset. In one mode, which control line is asserted is determined by the value stored in a particular register; whatever value is randomly determined to be in the register at system reset determines which control line is asserted. In another mode, a FLASH memory device indicates which control line to assert at reset; the FLASH memory device may indicate the same control line for every reset, or alternatively, it may update which control line to assert after every reset.

In one embodiment of the present invention, the agents with odd-valued agent identifications become the checker agents for the agents with even-valued agent identifications. That is, processor 303 (agent 1) can become the checker agent for processor 302 (agent 0) only, and processor 305 (agent 3) can become the checker agent for processor 304 (agent 2) only. As discussed above, however, the agent identifications are based on which BREQ[3:0]# control line is active at system reset, which may change between resets.

It should be understood by those skilled in the art that other mechanisms are within the scope and spirit of the present invention which may be employed for determining which agent is a checker for which master agent. For example, the agents with even-valued agent identifications could become the checker agents for the agents with odd-valued agent identifications, so long as the interconnection of the BRx[3:0]# pins over the BREQ[3:0]# control lines were updated accordingly.

When a processor's A5# signal line is asserted at system reset the processor knows the system is operating in FRC-master/checker mode. Thus, if the processor's agent identification is an even value then it is a master agent; if the processor's agent identification is an odd value then it is a checker agent. However, in order to operate in FRC-master/checker mode the checker agent must operate as if it were the master; thus, the checker agent's agent identification is decremented by one so that it matches its master agent's agent identification.

For example, if BREQ0# control line 320 were asserted and the A5# signal line were not asserted at system reset, then the processor identifications would be:

| Processor | Agent Identification |
|---|---|
| 302 | 0 |
| 303 | 1 |
| 304 | 2 |
| 305 | 3 |

However, if BREQ0# control line 320 and A5# signal line 312 were both asserted, the agent identifications would be:

| Processor | Agent Identification |
|---|---|
| 302 | 0 |
| 303 | 0 |
| 304 | 2 |
| 305 | 2 |

By assigning the same agent identification to both the master agent and the checker agent, the checker agent believes it has ownership of the bus whenever the master agent has ownership of the bus. The checker agent is thus performing the same tasks as the master agent.

In the arbitration scheme supported by one embodiment of the present invention, each processor updates its arbitration counter in a modulo-wraparound fashion when the agent with ownership of the bus releases the bus (i.e., 0, 1, 2, 3, 0, 1, etc.). In this way, each processor has ownership of the bus when its arbitration counter equals zero, which is supported by the interconnection of processors as shown in FIG. 3. As can be seen from FIG. 3, whenever an agent(x) asserts its BRx0# pin, because it is the bus owner, the value will be seen on another BRyn# pin of each other processor (y). Thus, in order for processor 303 to act as a checker for processor 302, a modification of the signals over the BREQ [3:0]# control lines must be made. That is, the signal asserted from BR00# of processor 302 must be processed as if it were received by BR10# of processor 303, even though it is received by the BR13# pin of processor 303.

Figure 4:
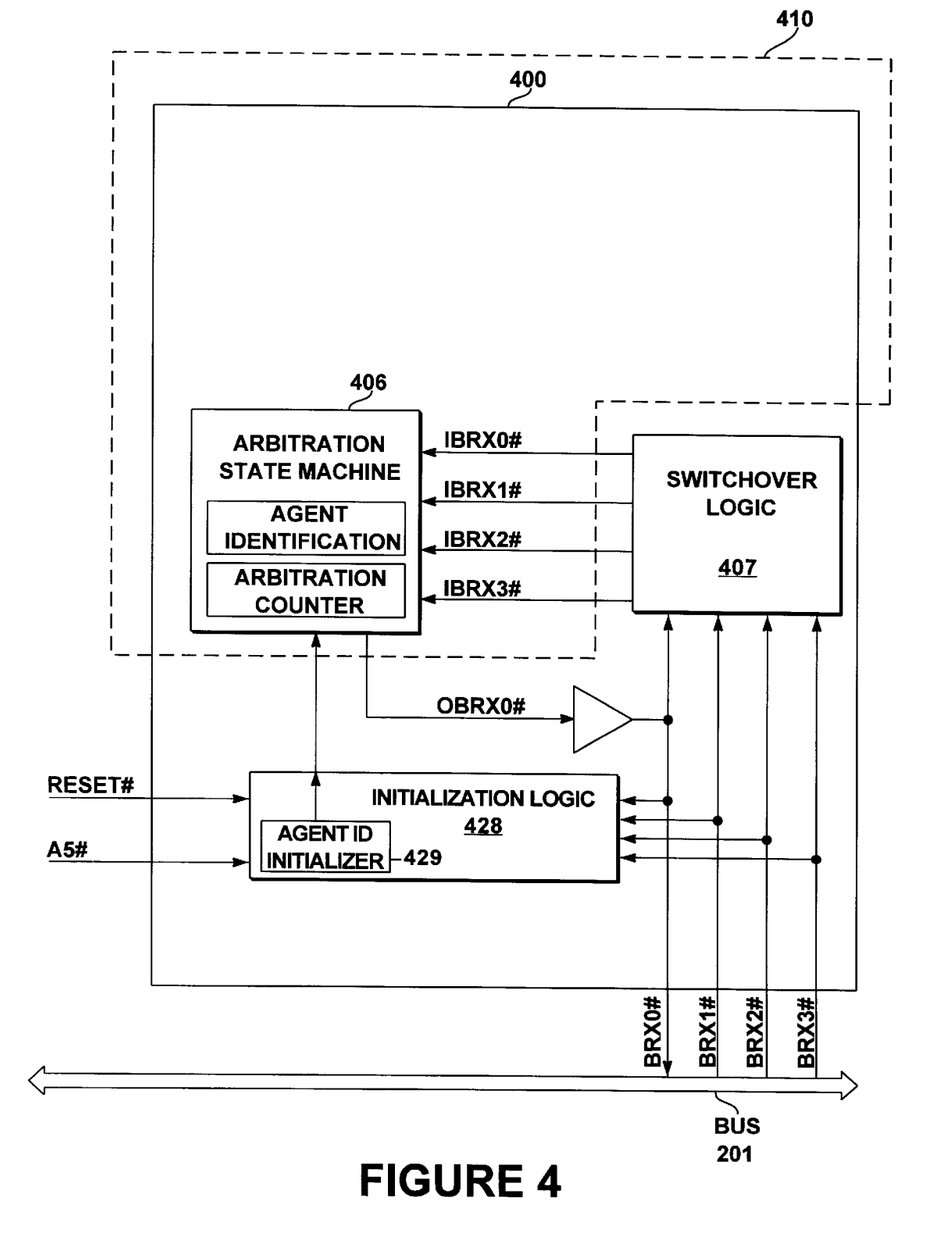
FIG. 4 is an exemplary block diagram of a processor of one embodiment of the present invention.

FIG. 4 shows an exemplary partial diagram of a processor (x) of the present invention. Processor 400 contains an arbitration state machine 406 and switchover logic 407. Switchover logic 407 and its associated logic, shown in more detail in FIG. 5, serves as the arbitration interface between bus 201 and the remainder of processor 400, shown by dashed line 410.

Arbitration state machine 406 manages whether processor 400 is allowed ownership of bus 201. Arbitration state machine 406 maintains the arbitration counter for processor 400 and issues a bus request on OBRx0#, which may drive BRx0# as described below, when processor 400 requires ownership of bus 201. IBRx0# is also input to arbitration state machine 406, as well as IBRx1#, IBRx2# and IBRx3#, which are used to indicate bus requests by other processors on bus 201.

Initialization logic 428 initializes the arbitration state machine 406 at system reset. Initialization logic 428 performs this initialization when a RESET# signal is asserted, as discussed above. Initialization logic 428 determines the agent identification and the initial arbitration counter value contained in arbitration state machine 406, as described above. An agent id initializer 429 within initialization logic 428 calculates the agent identification as described above. Initialization logic 428 determines the agent identification based on which BRxn# pin is asserted and whether the A5# signal line is asserted, as discussed above.

When processor 400 is operating in multiple processor mode, or as the master agent in a FRC-master/checker pair, the BRx0# through BRx3# signals will travel directly between arbitration state machine 406 and bus 201 through switchover logic 407. The signal paths are not altered; that is, the value received on the BRx0# pin of processor 400 will be input to arbitration state machine 406 as the IBRx0# signal. Additionally, bus request signals from arbitration state machine 406 are issued to bus 201 on the BRx0# pin of processor 400.

However, when processor 400 is operating as the checker agent of a FRC-master/checker pair, allowing the signal received on the BRx0# pin of processor 400 to be input to arbitration state machine 406 as the IBRx0# signal would not provide accurate checking due to the processor interconnection, as described above. Thus, switchover logic 407 must modify the signal paths to allow proper checking by the checker agent.

Figure 5:
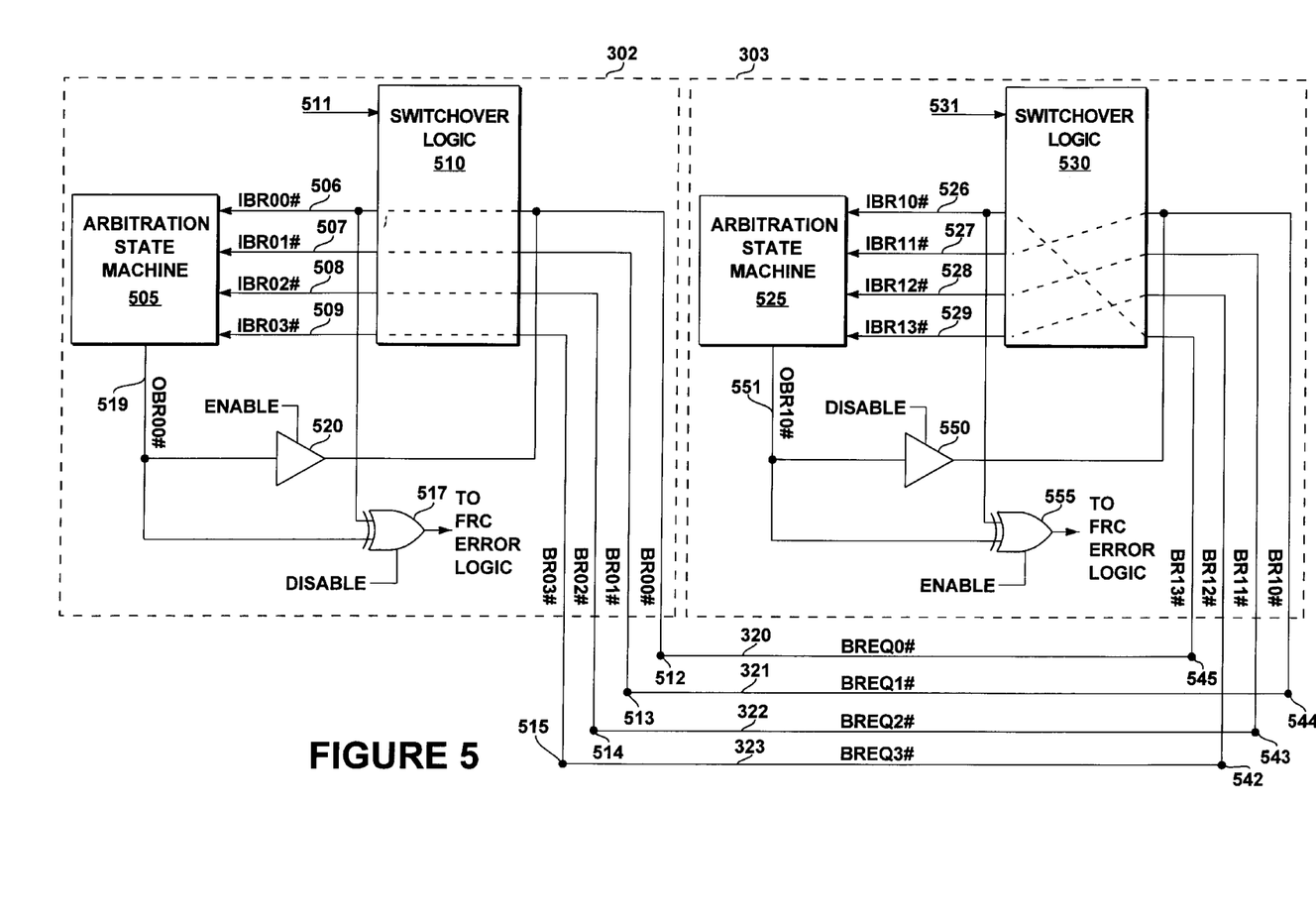
FIG. 5 is an exemplary block diagram of a FRC-master/checker pair configuration.

FIG. 5 shows the interconnection between an exemplary FRC-master/checker pair according to the present invention. When processor 303 is operating as the checker agent for a master agent, e.g. processor 302, it is necessary for checker processor 303 to behave as though it were master processor 302. That is, the internal operation of checker processor 303 should be the same as the internal operation of master processor 302, although the output of checker processor 303 should not be allowed onto the bus.

The logic shown in FIG. 5 provides this control. In one embodiment, the logic shown in FIG. 5 is the FRC logic 241 of FIG. 2a. The paths for the signals received on pins 542, 543, 544, and 545 of checker processor 303 are modified such that the internal operation of the checker agent mirrors that of the master agent. Note that due to the modification of signal paths by switchover logic 530, the remainder of checker processor 303 (shown by example by dashed line 410 in FIG. 4), operates without taking into account whether it is operating in multiple processor mode, as a master agent, or as a checker agent.

Arbitration state machine 505 of processor 302, which is processor(0) as shown in FIG. 5, is coupled to switchover logic 510 by the four internal arbitration signals. These four signals are internal IBR00# signal 506, internal IBR01# signal 507, internal IBR02# signal 508, and internal IBR03# signal 509. The operation of switchover logic 510 is dependent on whether the system is operating as a master agent or as a checker agent.

When operating as a master agent, switchover logic 510 does not modify the signal paths from BR0[3:0]# pins 515, 514, 513, and 512 to the IBR0[3:0]# signals 509, 508, 507 and 506, as shown in processor 302 of FIG. 5. That is, the signal received by master processor 302 on BR00# pin 512 is fed directly as IBR00# signal 506 by switchover logic 510. Thus, the signal received by master processor 302 on pin BR0n# is fed directly as IBR0n# signal by switchover logic 510.

Switchover logic 510 operates in a conventional manner and either allows the signal paths to remain unmodified as shown, or modifies them as shown in switchover logic 530. Whether the paths are modified in switchover logic 510 is dependent on the input signal 511. In one embodiment, if the input signal 511 is low the paths are as shown in switchover logic 510, whereas if the input signal 511 is high the paths are as shown in switchover logic 530.

Processor 302 also contains logic to signal an FRC error, i.e., XOR gate 517. When operating as the master agent XOR gate 517 is disabled, as shown in FIG. 5. Processor 302 knows whether the system is operating in FRC mode based on the assertion of the A5# signal at system reset as described above. If operating in FRC mode, processor 302 knows whether it is a master agent or a checker agent based on its agent identification, as described above. Since XOR gate 517 is disabled, no signal indicating a FRC error will be sent to FRC error logic by processor 302 when it is operating as a master agent.

As discussed above, when processor 302 desires ownership of the bus it asserts a bus signal on its BR00# pin 512. This bus request signal originates in the arbitration state machine 505 and is asserted as output OBR00# signal 519. Output OBR00# signal 519 is then input to buffer 520, which is enabled if processor 302 is operating as a master agent. Thus, the bus request signal is asserted through BR00# pin 512 and is also returned to the arbitration state machine 505 as IBR00# signal 506.

The logical layout of checker processor 303, which is processor(1) as shown in FIG. 5, including the logic of switchover logic 530, is identical to that of master processor 302; however, processor 303's operation is different. Input signal 531 to switchover logic 530 is asserted when the system is operating in FRC mode and processor 303 is a checker agent (this is determined as discussed above based on the assertion of the A5# signal and the value of the processor's agent identification). The assertion of input 531 indicates to switchover logic 530 to modify the signal paths from the bus pins 542 through 545, as shown in FIG. 5.

Switchover logic 530 modifies the signal paths in a modulo-wraparound fashion consistent with the rotating interconnect scheme between master processor 302 and checker processor 303. Switchover logic 530 modifies the signal paths in the following manner: the input from BR13# pin 545 is fed as internal IBR10# signal 526, the input from BR10# pin 544 is fed as internal IBR11# signal 527, the input from BR11# pin 543 is fed as internal IBR12# signal 528, and the input from BR12# pin 542 is fed as internal IBR13# pin 529.

This signal path modification within switchover logic 530 is necessary in order for checker processor 303 to properly check the operation of master processor 302. As discussed above, the BRxn# pins of each processor are interconnected in a rotating manner such that the input on the same line to two different processors is received by those two processors over two different BRxn# pins. However, in order for checker processor(x) to operate as if it were master processor(y), the values seen as the internal IBRxn# signals of checker processor(x) must be identical to the values seen as the internal IBRyn# signals of master processor(y). The switchover logic 530 provides this modification, as shown in FIG. 5. This signal path modification is determined based on the manner in which the BRxn# pins of the processors are interconnected.

Checker processor 303 also contains a buffer 550 identical to buffer 520 of master processor 302. When checker processor 303 is operating as a checker agent buffer 550 is disabled. Buffer 550 is disabled because the checker agent of a master/checker pair should not be issuing signals onto the bus (except for an FRC error signal). Thus, the output of buffer 550 is never asserted to the bus by checker processor 303 in checker mode.

However, when operating as a checker agent, XOR gate 555 is enabled. Thus, XOR gate 555 will be outputting a signal to the FRC error logic. Whether the signal output by XOR gate 555 is high or low is dependent on its two inputs: output OBR10# signal 551 and internal IBR10# signal 526. Internal IBR10# signal 526 is the output OBR00# signal from BR00# pin 512 of master processor 302, which is received by checker processor 303 on BR13# pin 545. Output OBR10# signal 551 is the output signal generated by checker processor 303, which is operating as if it were master processor 302. Thus, if the two inputs to XOR gate 555 do not match, then the operation of the master agent and the checker agent are not the same, and XOR gate 555 issues a signal to the FRC error logic indicating so.

Note that when a given processor is operating in multiple processor mode the switchover logic within that processor operates identically to the operation of switchover logic 510 in master processor 302, discussed above. That is, the signals received on the BRxn# pins of processor(x) are fed directly as its internal IBRxn# signals; the signal paths are not modified. Similarly, the buffer for the output OBRx0# signal of processor(x) is enabled and the XOR gate for FRC errors is disabled.

As can be seen from the above description, the logic which supports FRC mode is identical for each processor. Thus, any processor can operate as a FRC agent, or operate individually in multiple processor mode. Which of these modes a given processor operates in at any given moment is dependent on the input to its switchover logic block and whether the buffer and XOR gate coupled to its output OBRx0# signal are disabled or enabled. It should be understood by those skill in the art that due to the particular rotating interconnect of the BREQ[3:0]# signals of different processors, when BREQ0# is active at system reset, processor 302 (agent 0) and processor 304 (agent 2) are the only eligible FRC master agents, and processor 303 (agent 1) and processor 305 (agent 3) are the only eligible FRC checkers. That is, in one embodiment a multiple processor system with a FRC checker agent and no corresponding FRC master agent being present is not valid.

The FRC error logic discussed above may be any of a wide variety of conventional FRC error logic systems. In one embodiment, the FRC error logic has a varied response dependent on whether the high output came from XOR gate 555, or the XOR gate of another processor. In an alternate embodiment, FRC error logic 516 causes a system interrupt upon receipt of a high output from any of the XOR gates. The response of the computer system to a high output signal from an XOR gate is not material to the present invention, and thus will not be described further.

It should be understood by those skilled in the art that although the description above discusses a high output indicating an FRC error and a low output indicating no FRC error, the signals may be reversed. That is, a low output indicates an FRC error whereas a high output indicates no error. This may be accomplished by, for example, inverting the output from each XOR gate.

Furthermore, it should be noted that although the above discussion uses an XOR gate to compare the signals from master agents and checker agents, any comparator which indicates to the FRC error logic that a mismatch occurred could be used in place of an XOR gate.

It should further be noted that the physical logic between the arbitration state machines and the bus shown in FIG. 5 is identical for all processors on the bus. That is, as is shown in FIG. 3, the BRx0# output of processor(x) is the BRy3# input into the next processor(y) following the modulo-wraparound system; e.g., the BR20# output of processor 304 is the BR33# input to processor 305. This interconnection is due to the modulo-wraparound nature of the arbitration counters.

It should be understood by those skilled in the art that although the above description discusses a maximum of four agents on the bus, that number may be increased or decreased. For example, a bus with a maximum of two agents would have BRx0# and BRx1# pins interconnected, and a bus with a maximum of six agents would have BRx0# through BRx5# pins interconnected. Additionally, an odd number of agents could be coupled to the bus with at least one master/checker pair and the odd leftover agent acting as a master with no checker checking its operation.

It should also be noted that in the example of FIG. 3, the BREQ[3:0]# control lines 323, 322, 321, and 320 which can only be driven by checker agents are not used during arbitration. Thus, for example, if processor 303 is the checker agent for processor 302, then BREQ1# control line 321 is not driven because the logic of FIG. 5 terminates any output OBR10# signal from processor 303 before it reaches the bus. However, all processors contain the logic to modify input signals, and all BREQ[3:0]# control lines are included, because determining which agents are masters and which are checkers is based on their agent identifications, which is controlled by the BREQx# control line power-on logic 310 asserts at system reset. Thus, which processor is actually checking which other processor can vary from system to system, or from reset to reset within the same system.

It should also be comprehended by those skilled in the art that although the above description discusses all processors being interconnected over a set of BREQ# control lines, certain situations may exist where this is not required. For example, if a computer system is designed to always operate in FRC mode with processor 303 checking for processor 302, then the BREQ1# control line need not be interconnected because the requests for bus access by processor 303 are never output to the bus.

Thus, a system providing auto-configuration support for a multiple processor-ready pair or FRC-master/checker pair has been described. While the present invention has been described in particular embodiments, it should be appreciated that the present invention should not be construed as limited by such embodiments, but rather construed according to the below claims.

What is claimed is:

1. A system comprising:
   a bus;
   a plurality of bus agents coupled to said bus wherein each said bus agent includes an internal agent identifier and a plurality of inputs coupled to said bus;
   a first bus agent being one of said plurality of bus agents and including a first circuit to determine said internal agent identifier for said first bus agent; and
   initialization logic to,
   issue a first signal to one of said plurality of inputs over said bus at a predetermined condition indicating to said first bus agent whether said system is operating in a multiple processor mode or a master/checker mode, and
   issue a second signal to one of said plurality of inputs over said bus at said predetermined condition, wherein said first bus agent determines said internal agent identifier based on said first and second signals.

2. The system of claim 1 wherein said first bus agent includes a second circuit which asserts arbitration signals from said bus to an arbitration unit of said first bus agent as if said first bus agent were a second bus agent when said system is operating in said master/checker mode.

3. The system of claim 1 wherein a first agent identification logic included in said first bus agent determines said internal agent identifier for said first bus agent and a second agent identification logic included in a second bus agent determines an agent identifier for said second bus agent, wherein said agent identifier for said first bus agent is different from said agent identifier for said second bus agent.

4. The system of claim 3 wherein said first bus agent includes agent identification initialization logic which changes said first bus agent's agent identifier to correspond to said second bus agent's agent identifier.

5. The system of claim 3 wherein said first bus agent is a checker agent of a functional redundancy checking master/checker pair and said second bus agent is a master agent of said functional redundancy checking master/checker pair.

6. The system of claim 1 wherein said predetermined condition is system reset.

7. The system of claim 1 wherein, when said system is operating in said master/checker mode, a second circuit of said first bus agent asserts arbitration signals for said bus as if said first bus agent were a second bus agent if said first bus agent's internal agent identifier is odd-valued, and a first circuit of said second bus agent asserts arbitration signals for said bus as if said second bus agent were said first bus agent if said first bus agent's internal agent identifier is even-valued.

8. A system comprising:
   a bus;
   a first and second agent coupled to said bus, said first agent including a first plurality of inputs coupled to said bus and said second agent including a second plurality of inputs coupled to said bus;
   a first circuit included in said first agent to determine a first internal agent identifier;
   a second circuit included in said second agent to determine a second internal agent identifier;
   initialization logic coupled to said bus to,
      issue a first signal to one input of said first plurality of inputs and one input of said second plurality of inputs over said bus at a predetermined condition indicating to said first agent and said second agent whether said system is operating in a first mode or a second mode, and
      issue a second signal to one of said first plurality of inputs and one of said second plurality of inputs over said bus at said predetermined condition;
   a third circuit included in said first agent to determine said first agent's relationship with said second agent based on said second signal; and
   a fourth circuit included in said second agent to determine said second agent's relationship with said first agent based on said second signal.

9. The system of claim 8 wherein said first plurality of inputs is coupled to said second plurality of inputs over said bus such that said first signal is received by said first agent and said second agent on analogous inputs, and said second signal is received by said first agent and said second agent on non-analogous inputs.

10. The system of claim 8 wherein said first internal agent identifier is identical to said second internal agent identifier when said system is operating in said first mode.

11. The system of claim 8 wherein said first internal agent identifier is different from said second internal agent identifier when said system is operating in said second mode.

12. The system of claim 8 wherein said predetermined condition is system reset.

13. The system of claim 8 wherein a fifth circuit included in said first agent asserts arbitration signals from said bus as if said first agent were said second agent when said system is operating in said first mode.

14. The system of claim 8 wherein said first agent's relationship with said second agent comprises checking the operation of said second agent when said system is operating in said first mode.

15. A system comprising:
   a bus; and
   one or more bus agents coupled to said bus wherein each of said one or more bus agents includes,
      a plurality of inputs,
      a circuit, coupled to a first input of said plurality of inputs, to determine, based on a first signal received on said first input at a predetermined condition, whether said bus agent is operating in an independent mode or a master/checker mode, and
      a reconfigurable signal path coupled to both said plurality of inputs and a plurality of internal signals, wherein said reconfigurable signal path is to connect a signal received on a second input of said plurality of inputs to a first internal signal of said plurality of internal signals responsive to said first signal being received in a first state, and to connect said signal received on said second input to a second internal signal of said plurality of internal signals responsive to said first signal being received in a second state.

16. The system of claim 15 wherein said circuit determines whether said apparatus is operating in said independent mode or said master/checker mode based on whether said first signal is in a first state or a second state.

17. An apparatus comprising:
   a plurality of inputs;
   a first circuit, coupled to a first input of said plurality of inputs, to determine, based on a first signal received on said first input at system reset, whether said apparatus is operating in an independent mode or a master/checker mode; and
   a second circuit, coupled to said plurality of inputs, to prevent a second signal to be issued by said apparatus from being driven onto a bus coupled to said apparatus.

18. A method for initializing a plurality of agents in a computer system to operate in either an independent mode or a master/checker mode in which each agent is coupled to a bus over a plurality of inputs, said method comprising the steps of:
   issuing a first signal to one input of said plurality of inputs of each agent of said plurality of agents over said bus at a predetermined condition indicating to said plurality of agents whether said system is operating in said independent mode or said master/checker mode;
   issuing a second signal to one input of said plurality of inputs of each agent of said plurality of agents over said bus at said predetermined condition;
   each agent of said plurality of agents determining an internal agent identification based on the identity of said one input on which said second signal was received; and
   each agent of said plurality of agents determining its relationship with the remaining agents of said plurality of agents based on whether said first signal is in a first state or a second state.

19. The method of claim 18 wherein said second signal is received by a first agent of said plurality of agents on an input non-analogous to the input on which said second signal is received by a second agent of said plurality of agents.

20. The method of claim 18 wherein a first agent and a second agent of said plurality of agents determine identical internal agent identifications.

21. The method of claim 18 wherein each agent of said plurality of agents determines a unique internal agent identification.

22. The method of claim 18 wherein said predetermined condition is system reset.

23. The method of claim 18, further comprising the step of a first agent of said plurality of agents checking the operation of a second agent of said plurality of agents, provided said system is operating in said master/checker mode, otherwise said first agent operating independent of said second agent when said system is operating in said independent mode.

24. The method of claim 18, further comprising the step of a first agent of said plurality of agents checking the operation of a second agent of said plurality of agents.

25. The method of claim 24, further comprising the step of said first agent issuing a third signal if the operation of said second agent does not match the operation of said first agent.

26. An apparatus comprising:
   a plurality of inputs;
   a circuit, coupled to a first input of said plurality of inputs, to determine, based on a first signal received on said first input at a predetermined condition, whether said apparatus is operating in an independent mode or a master/checker mode; and
   a reconfigurable signal path coupled to both said plurality of inputs and a plurality of internal signals, wherein said reconfigurable signal path is to connect a signal received on a second input of said plurality of inputs to a first internal signal of said plurality of internal signals responsive to said first signal being received in a first state, and to connect said signal received on said second input to a second internal signal of said plurality of internal signals responsive to said first signal being received in a second state.

27. The apparatus of claim 26, further comprising a comparator, coupled to said circuit, to compare said signal received on said second input with a third signal, and to indicate whether said signal received on said second input matches said third signal.

28. The apparatus of claim 27 wherein said comparator issues a fourth signal in a third state if said signal received on said second input matches said third signal and issues said fourth signal in a fourth state if said signal received on said second input does not match said third signal.

29. A system comprising:
   a bus;
   a plurality of bus agents coupled to said bus wherein each said bus agent includes an internal agent identifier and a plurality of inputs coupled to said bus, wherein a first bus agent of the plurality of bus agents comprises a digital signal processor;
   a first processor being one of said plurality of bus agents and including a circuit to determine said internal agent identifier for said first processor; and
   initialization logic to,
      issue a first signal to one of said plurality of inputs over said bus at a predetermined condition indicating to said first processor whether said system is operating in a multiple processor mode or a master/checker mode, and
      issue a second signal to one of said plurality of inputs over said bus at said predetermined condition, wherein said first processor determines said internal agent identifier based on said first and second signals.

30. A system comprising:
   a first bus;
   a plurality of processors coupled to said first bus wherein each said processor includes an internal agent identifier and a plurality of inputs coupled to said first bus;
   a second bus coupled to said first bus via a bridge;
   a storage device controller, coupled to said second bus, to control data transfers to and from a removable magnetic storage device;
   a first processor being one of said plurality of processors and including a circuit to determine said internal agent identifier for said first processor; and
   initialization logic to,
      issue a first signal to one of said plurality of inputs over said first bus at a predetermined condition indicating to said first processor whether said system is operating in a multiple processor mode or a master/checker mode, and
      issue a second signal to one of said plurality of inputs over said first bus at said predetermined condition, wherein said processor determines said internal agent identifier based on said first and second signals.

31. A system comprising:
   a bus;
   a digital signal processor coupled to said bus; and
   a first processor, coupled to said bus, including,
      a plurality of inputs,
      a circuit, coupled to a first input of said plurality of inputs, to determine, based on a first signal received on said first input at a predetermined condition, whether said first processor is operating in an independent mode or a master/checker mode, and
      a reconfigurable signal path coupled to both said plurality of inputs and a plurality of internal signals, wherein said reconfigurable signal path is to connect a signal received on a second input of said plurality of inputs to a first internal signal of said plurality of internal signals responsive to said first signal being received in a first state, and to connect said signal received on said second input to a second internal signal of said plurality of internal signals responsive to said first signal being received in a second state.

32. A system comprising:
   a first bus;
   a second bus coupled to said first bus via a bridge;
   a storage device controller, coupled to said second bus, to control data transfers to and from a removable magnetic storage device; and
   a plurality of processors coupled to said first bus wherein each of said plurality of processors includes,
      a plurality of inputs,
      a circuit, coupled to a first input of said plurality of inputs, to determine, based on a first signal received on said first input at a predetermined condition, whether said processor is operating in an independent mode or a master/checker mode, and
      a reconfigurable signal path coupled to both said plurality of inputs and a plurality of internal signals, wherein said reconfigurable signal path is to connect a signal received on a second input of said plurality of inputs to a first internal signal of said plurality of internal signals responsive to said first signal being received in a first state, and to connect said signal received on said second input to a second internal signal of said plurality of internal signals responsive to said first signal being received in a second state.

33. A system comprising:
   a bus;
   a digital signal processor coupled to said bus;
   a plurality of processors coupled to said bus, wherein each of the plurality of processors includes,
      a plurality of inputs,
      a first circuit, coupled to a first input of said plurality of inputs, to determine, based on a first signal received on said first input at system reset, whether said processor is operating in an independent mode or a master/checker mode, and a second circuit, coupled to said plurality of inputs, to prevent a second signal to be issued by said processor from being driven onto said bus.

34. A system comprising:

a bus;

a storage device controller, coupled to said bus, to control data transfers to and from a removable magnetic storage device; and a processor, coupled to the bus, including,
  a plurality of inputs,
  a first circuit, coupled to a first input of said plurality of inputs, to determine, based on a first signal received on said first input at system reset, whether said processor is operating in an independent mode or a master/checker mode, and
  a second circuit, coupled to said plurality of inputs, to prevent a second signal to be issued by said processor from being driven onto said bus.

35. A system comprising:

a bus;

digital signal processor coupled to said bus;

a processor, coupled to said bus, including,
  a plurality of inputs,
  a first circuit, coupled to a first input of said plurality of inputs, to determine, based on a first signal received on said first input at system reset, whether said processor is operating in an independent mode or a master/checker mode, and
  a second circuit, coupled to said plurality of inputs, to prevent a second signal to be issued by said processor from being driven onto said bus.

36. A system comprising:

a bus;

a digital signal processor coupled to said bus; and a processor, coupled to said bus, including,
  a plurality of inputs,
  a circuit, coupled to a first input of said plurality of inputs, to determine, based on a first signal received on said first input at a predetermined condition, whether said processor is operating in an independent mode or a master/checker mode, and
  switchover logic coupled to said plurality of inputs for feeding a signal received on a second input of said plurality of inputs along a first signal path responsive to said first signal being received in a first state, and for feeding said signal received on said second input along a second signal path responsive to said first signal being received in a second state.

* * * * *